J. H. ELWARD.
Sorghum Evaporator.

No. 52,402.

Patented Feb. 6, 1866.

Witnesses:
J. J. Peyton
Theodore Lang

Inventor:
John H. Elward
By Baldwin & Son
Attys.

UNITED STATES PATENT OFFICE.

JOHN H. ELWARD, OF POLO, ILLINOIS.

IMPROVED EVAPORATOR.

Specification forming part of Letters Patent No. 52,402, dated February 6, 1866.

*To all whom it may concern:*

Be it known that I, JOHN H. ELWARD, of Polo, in the county of Ogle and State of Illinois, have invented a new and useful Improvement in Sugar-Evaporating Pans; and I do hereby declare that the following is a full, clear, and exact description of the construction and operation of the same, reference being had to the annexed drawings, making a part of this specification, in which—

Figure 1:
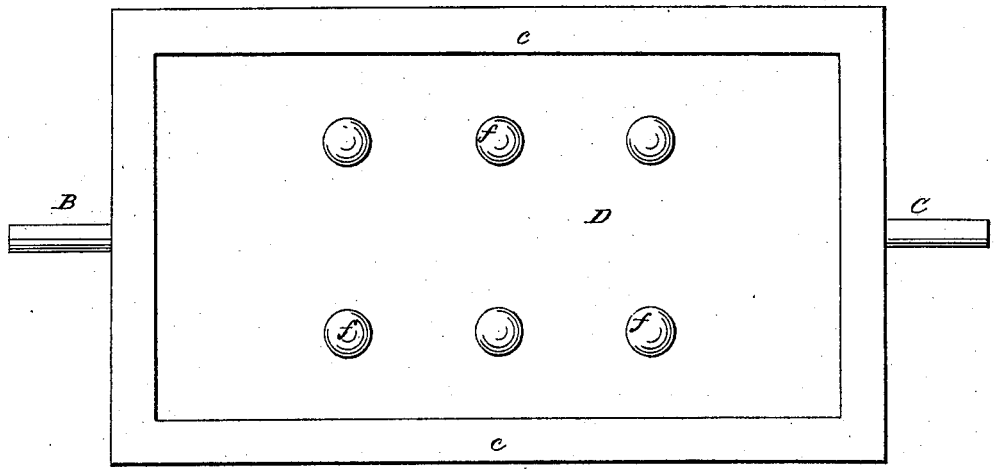
Figure 2:
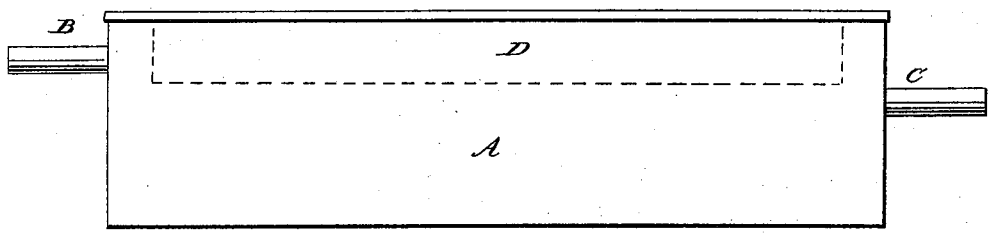
Figure 3:
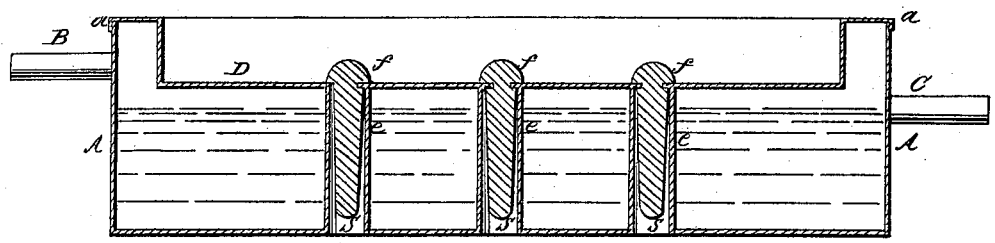

Figure 1 represents a top view of my invention; Fig. 2, a side elevation, and Fig. 3 a longitudinal section through the same.

In evaporating the juice of cane in the ordinary boiler the sirup, as it thickens, is liable to be scorched from the heaviest portion of the liquid remaining in contact with the over heated surface of the boiler.

It is the object of my invention to so construct the boiler for cane-juice that it will not scorch the sirup; and to this end my invention consists of an evaporating-pan having iron pins in the bottom, with semicircular or elevated heads that rise above the plane of the bottom of the pan and with ends long enough to project through tubes in the hot-water jacket in which the pan is placed into the furnace over which the hot-water jacket rests, whereby I boil the juice of the cane with hot water at one level and by the direct heat of the furnace at a different level, so that the liquid to be evaporated shall be kept in active ebullition, and leave no portion long enough in contact with either heating-surface to become scorched.

In order to carry out the objects of my invention I construct a boiler, A, of any desired form, that in the drawings being rectangular and of a capacity adapted to the quantity of work required. This boiler is perforated at regular intervals, $s\ s\ s$, through its bottom, and short pipes, $b\ b\ b$, are fastened in any suitable manner in these perforations and extend upward in the boiler above the level of the water-line. (Shown in blue ink.) This boiler has a pipe, B, through which water can be introduced into it, and a pipe, C, to permit its escape from the boiler at such a level as will prevent the water when boiling from passing over the top of the short pipes $b\ b\ b$. This boiler may be set over a properly-constructed grate or surrounded by regular furnace-walls, so that the water in it may be kept boiling by the direct action of the fire in the grate or furnace. I now construct a pan, D, having a flange, $c$, terminating in a lip, $a$, that fits neatly on the top of the boiler A. The bottom of the pan is perforated at intervals to register truly with the short pipes $b$ in the boiler, and bolts $e\ e\ e$, having semicircular heads $fff$, are inserted in the bottom of the pan and so fastened that they shall enter the short pipes $b\ b\ b$ and reach near or into the flame of the furnace.

The operation is as follows: The boiler being in position over the furnace, the pan is placed upon it with its bolts passing into the short pipes on the top of which its bottom rests. Water is now admitted into the boiler until it rises to the escape-pipe, and a fire kindled in the furnace. The pan is then filled with cane-juice and is kept boiling by the hot water in the boiler, while the bolts receive a high degree of heat from the direct action of the fire to which they are exposed in their several tubes, and as the semicircular heads attain through conduction a degree of heat greater than that imparted to the cane-juice from the hot water, the tendency is always to throw off the juice more rapidly from the bolt-heads, and thus a more active ebullition is constantly preserved without the possibility of scorching the juice as it comes down to the condition of sirup, for no portion of it, however thick, can with ordinary precaution remain long enough in contact with an overheated surface to be scorched or injured.

It is obvious that by letting the top of the pan fall lower on the edge of the boiler the pan can be raised and lowered at pleasure, and the degree of heat acting on the juice or sirup can be regulated with precision, and any number of bolts can be used.

It is also obvious that my invention is well adapted to culinary purposes, such as cooking fruits or vegetables or preparing preserves, candies, &c.

What I claim as my invention, and desire to secure by Letters Patent, is—

1. The method described for boiling cane-juice by applying the heat at two levels in the liquid, substantially as set forth.

2. The evaporating-pan, constructed, arranged, and operating substantially in the manner set forth.

3. The combination of the pan with the boiler, when constructed, arranged, and operating substantially in the manner described.

In testimony whereof I have hereunto subscribed my name.

JOHN H. ELWARD.

Witnesses:
　JOHN A. HOFFMAN,
　J. P. FOLTZ.